Feb. 27, 1940.　　　　R. D. EVANS　　　　2,192,035
RELAY SYSTEM FOR ELIMINATING DIRECT-CURRENT EFFECTS OF TRANSIENTS
Filed Nov. 12, 1937
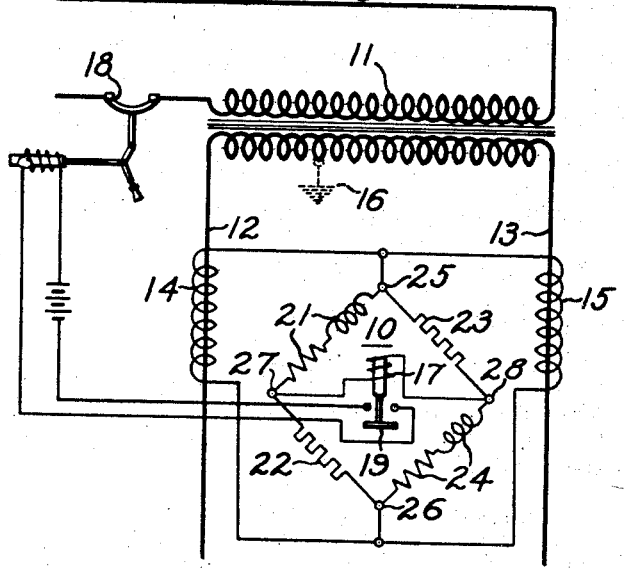
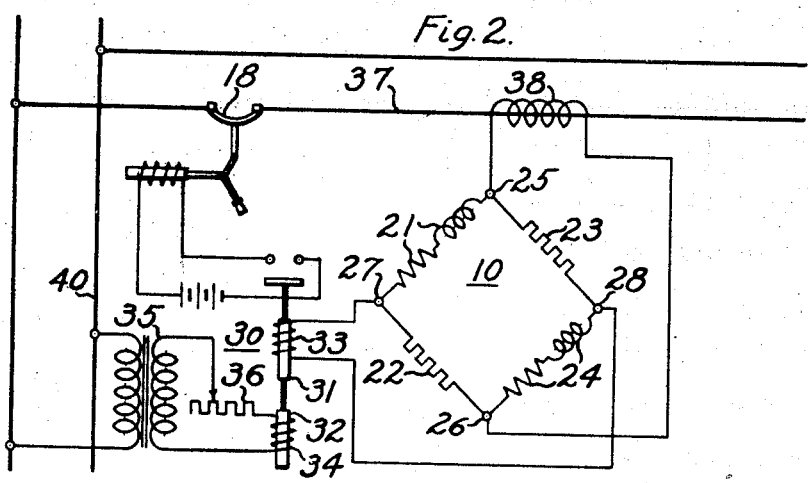
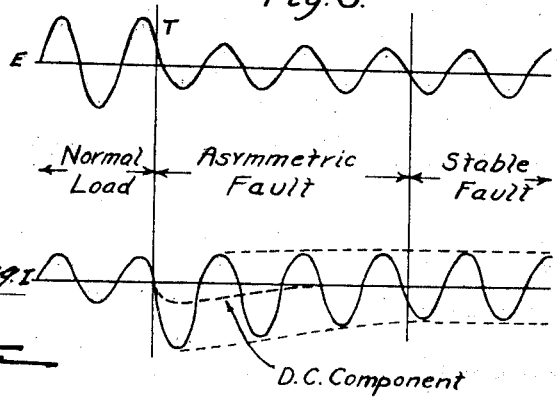
INVENTOR
Robert D. Evans.
BY
ATTORNEY Patented Feb. 27, 1940

2,192,035

UNITED STATES PATENT OFFICE 2,192,035

RELAY SYSTEM FOR ELIMINATING DIRECT-CURRENT EFFECTS OF TRANSIENTS

Robert D. Evans, Pittsburgh, Pa., assignor to Westinghouse Electric & Manufacturing Company, East Pittsburgh, Pa., a corporation of Pennsylvania Application November 12, 1937, Serial No. 174,204

15 Claims. (Cl. 175—294)

This invention relates to relays and particularly to protective relays and to protective systems.

The principal object of my invention is to provide a protective relay and system that shall be suitable for high speed operation, but that shall not be susceptible to the direct current component of transients upon the occurrence of asymmetric faults in a system, and that shall be free of false operations.

Another object of my invention is to provide a selective network whereby a fault current may be sub-divided to segregate the direct-current or transient component of the fault current from the steady alternating current value of the fault current.

It is well known that when a voltage is initially applied to an alternating current circuit containing reactance but negligible resistance, or when the applied voltage is suddenly increased, or when the voltage is suddenly decreased, as upon the occurrence of a sudden short circuit, the current that immediately initially begins to flow does not, in general, instantly reach an amplitude corresponding to the amplitude determined by the steady state impedance of the circuit. Unless the change begins at a time when the instantaneous voltage is maximum, the circuit current will be so unbalanced with respect to the normal zero base line of the usual alternating current, that the immediate current will be displaced in such a way as to consist of, in effect, a unidirectional transient current superposed upon what would be the steady state value of the alternating current. Such transient current has in all actual circuits a logarithmic decrement which causes it to disappear within a few cycles. While it exists, however, the instantaneous values of the alternate half cycles of the alternating current, upon which the transient direct current is superimposed, will be higher or greater than the value of the corresponding half cycles of the steady state current.

Such random or chance effects of the transient currents have no fixed relation, to each other or to the characteristics of the circuit, and may vary with each type of circuit disturbance. Consequently, the transient effects establish direct current influences upon the protective relays in such manner that those effects are never necessarily the same, and, therefore, those effects are likely to cause false operations of the relays when the relays have been set or adjusted to operate upon the occurrence of certain predetermined faulty conditions of an expected type.

The variable and unpredictable character of such transient conditions have made it difficult, or impossible, in some instances to increase the speed of a protective relay, and to reduce its operating period to less than about two cycles, in circuits where such asymmetric faults are of frequent occurrence.

Because of the distortion of the fault current in the case of an asymmetric fault, the abnormally high values of some of the half waves of the current during the first few cycles of the fault current sometimes cause a protective relay to be operated, although the stable value of the fault current might be below the setting of the relay. Thus, a quick-acting relay, if used alone, would be subject to false operation upon the occurrence of an asymmetric fault, in view of the fact that the relay is quick-acting and is operative within the short time interval during which the asymmetrical component of the fault current is very strong.

In order to prevent such direct-current component of the asymmetric fault current from energizing the current winding of a relay, that is to be energized by the alternating component, I provide a bridge-type network connected between the circuit to be protected and the relay, in such manner as to sub-divide the fault current and to segregate the direct-current component from this alternating component, and to supply only the alternating current component to the relay winding.

Such selective network may be applied to all types of protective relays that are provided with a current winding that is to be energized in any way as a function of the circuit current.

The bridge network which I provide for the relay winding is set up with four arms arranged to provide two current paths, as in the case of the familiar Wheatstone bridge, with the relay winding connected between the two junction points of the respective paths, in the manner of the galvanometer in the Wheatstone bridge. Those two junction points will normally be of equal potential insofar as the direct current component is concerned. The total resistance value of each path is the same, so that the direct current component will distribute itself equally between both paths. Each path, however, includes a non-inductive resistor as one element, and an inductive impedance as the second element. The impedance has a resistance value equal to that of its companion resistor, plus a reactance value which is extremely high at the normal frequency of the circuit. The resistor and the associated reactor are disposed in reverse sequence in each of the two paths, so that the alternating current component may find a complete circuit through the resistor element of each path and the relay winding in series circuit relation.

I have illustrated the application of the bridge network to a current winding of different relays applied to protect circuits of two different types, in the accompanying drawing, in which:

Figure 1 is a diagram of a circuit arrangement whereby a relay is applied to provide differential protection for a generator or transformer winding, or other unit electrical device;

Fig. 2 is a diagram of a circuit in which a relay of the impedance type is applied to the protection of a feeder circuit; and Fig. 3 is a view of the current and voltage curves illustrating their variation in a load circuit upon the occurrence of an asymmetric fault in the circuit.

Referring first to Fig. 3, the curve E illustrates the line voltage of the circuit under consideration and being protected, while the curve I represents the current traversing that circuit. As indicated by the applied legends in Fig. 3, the value of the voltage is at its normal value and the value of the current is symmetrical during the normal load period. Upon the occurrence of an asymmetric fault at the instant corresponding to the vertical line T, the voltage of the system will drop and the current of the system will be modified according to the nature of the fault. As illustrated in Fig. 3, the current may change so that it will preponderate on one side of the zero base line for a short time interval. During that time interval, those first few cycles of the fault current are so displaced that the effect during such unbalanced period is equivalent to a direct current component superimposed upon the alternating current. Those first few half cycles of the current, that are so affected, are of greater amplitude than the value which the normal short circuit current assumes after the transient condition terminates. However, during the existence of such transient condition a quick-acting relay, that is responsive to the instantaneous value of the current traversing the circuit, would be subject to a false operation because of such emphasized and enlarged value of the circuit current resulting from the unbalancing effect of the transient.

In order to render the protective relays free of the influence of such unbalancing and falsely-indicating transient, I provide a bridge network 10 as shown in Figs. 1 and 2, to segregate the direct current component from the alternating current component of a fault current, and to supply only the alternating current component of the fault current to the protective relay that is guarding the circuit.

As shown in Fig. 1, a generator or transformer winding 11, or other electrical unit or device, is provided with differential protection to detect the occurrence of a faulty condition within the winding or device itself. Such protection is afforded by measuring the current in conductors 12 and 13 leading to both terminals of the winding 11, and differentially relating them or counterbalancing them. The current in those main conductors 12 and 13 is measured by two current transformers 14 and 15 that are connected in the usual closed circuit arrangement, so that the currents from the two transformers 14 and 15 will flow in a series circuit including only the transformers so long as the winding or device 11 is sound and the currents are equal.

Upon the occurrence of a fault such as a ground 16 upon the winding 11, or a short circuit between the winding 11 and an associated winding 8 in the generator or transformer, the currents through the main conductors 12 and 13 will no longer be equal, and an unbalanced current, which will correspond to the fault current increment, will flow through the protective relay network 10 to energize the relay 17 for the purpose of controlling a suitable device such as a circuit interrupter 18.

The protective relay network 10 comprises a current relay 17, which may be of any suitable type in which a current winding operates to control a switch 19 for the purpose of controlling an external circuit. In addition to the relay, the network is provided with four elements or arms 21, 22, 23 and 24, respectively. The four arms are arranged in the form of the well-known Wheatstone bridge, with current supplied to the bridge at the juncture points 25 and 26, and the relay winding connected to the bridge at the juncture points 27 and 28.

The arm 21, as illustrated, is a resistor with a certain amount of reactance. The element 24 is similar, and is equal in all respects, to the element 21. The elements 22 and 23 are pure resistors. The resistance values of the four elements are the same and equal for direct current. The impedances of the four elements are different, however, by reason of the reactance included in elements 21 and 24. The reactance values of elements 21 and 24 are large at the frequency of the circuit or system.

In view of the balanced and equal resistance values of the four elements in the network, a direct current between points 25 and 26 will subdivide and distribute itself equally between the two paths including reactor 21 and resistor 22 in one path, and resistor 23 and reactor 24 in the other path. As a further consequence of the equal values of the four elements of the two paths so formed, the two juncture points 27 and 28 to which the relay winding is connected, will be of equal potential so far as the direct current voltage drops are concerned. Consequently, if the fault current which is applied to the bridge network contains a transient quantity direct-current component, that direct-current component will flow equally through both paths of the bridge network and will not affect the relay winding.

Because of the reactance value in the bridge, however, the alternating current component of the fault current will be divided between the two paths in such proportions that only a small portion will traverse the reactance elements, and the major portion will traverse the two resistor elements and the relay in a series circuit to bypass the reactors, which offer a substantial impedance at normal system frequency. The design characteristics of the relay winding, as a matter of engineering, may be established according to the values of the resistance and reactance employed in the bridge network so that the winding and network will provide maximum response and operating efficiency with minimum burdens on the associated current transformer.

A further advantage of such segregating bridge network when applied to protect an electrical device or circuit as in Fig. 1, is that the effect of exciting currents are minimized.

In Fig. 2, I have illustrated the application of a similar network to an impedance relay 30.

The impedance relay 30 is usually provided with an actuating element 31 that is energized in accordance with the current in the circuit, and is also provided with a restraining element 32 that is energized in accordance with the voltage of the circuit. Impedance relays have been made of many designs but the general principle is that which is schematically illustrated in simple fashion in this figure as consisting of the actuating element 31 and of the restraining element 32. The actuating element 31 is arranged to be operated by a current winding 33 and the restraining element 32 is arranged to be controlled by a voltage winding 34.

The voltage winding 34 is energized from the secondary of a potential transformer 35, being connected in circuit with the secondary winding of the transformer and a resistor 36 for adjustably controlling the degree of energization of the winding 34 for the particular circuit with which it is associated. The current winding 33 derives its energization from the feeder circuit 37, that is to be controlled, through a current transformer 38 and a bridge type network 10, similar to that described in connection with the circuit of Fig. 1.

The network 10 is composed of the same elements in the case of Fig. 2 as it was in the arrangement shown in Fig. 1. The action of the network is the same. Upon the occurrence of an asymmetric fault upon the feeder circuit or section 37, the current supplied to the network 10 by the current transformer 38 is sub-divided into its direct current component and into its alternating current component. The direct current component distributes itself equally between the two paths through the bridge network 10 thereby establishing points of equal potential at the junctures of the network to which the current winding 33 is connected. Consequently, the current winding 33 of the relay is not energized by the direct current component in the circuit current at the time of the fault.

The alternating current component, however, of the current supplied to the bridge network, traverses principally the arm 23 that is free of reactance and thence out through the current coil 33 of the relay, and then back through the resistance arm 22 of the network. In that manner the alternating current component of the circuit current is selectively segregated from the circuit current at the time of the fault and is supplied to the current winding of the impedance relay 30.

The impedance relay is utilized to measure the impedance of the load circuit in order to measure the distance to the location of a fault, and to control the operation of protective equipment in response to an abnormal circuit condition in the system. When the impedance relay is first applied to the system, its respective time and current and voltage settings are adjusted according to the length of the section 37 of the system that is to be protected by the relay. The balance between the counteracting forces of the current coil and of the voltage coil of the impedance relay is intended to provide an indication corresponding to the condition in the system, both under normal conditions and under abnormal or faulty conditions. In the case of normal conditions, the voltage winding will be energized by the full normal voltage of the system and will serve to restrain action of the current element, irrespective of current conditions within the normal loading capacity of the system. Upon the occurrence of an abnormal condition, however, such as caused by a fault, the voltage of the system will drop and the restraining effort of the voltage winding will consequently be diminished, while at the same time the actuating effort of the current-energized element will be increased.

The amount of drop in voltage from the normal voltage of the system would ordinarily serve to indicate the distance of the fault from the bus or supply point 40 of the circuit such as shown in Fig. 2. When the impedance relay is first installed to protect the system, its adjustments are all correlated to the normal impedance of the section to be protected. Upon the occurrence of an asymmetric fault, the direct current component of such a fault has, in the past, introduced an unpredictable and unconstant influencing factor that affected the operation of the current energized device. Impedance relays were for that reason subjected to erratic and false operations, since the direct current component varies with many different types of asymmetric faults which could not be compensated for. In U. S. Patent No. 1,924,307, of Leslie N. Crichton, issued August 29, 1933, to Westinghouse Electric & Manufacturing Company, the broad principle is disclosed of a transient shunt for by-passing or shunting the direct current transient of a fault current around a current winding of a relay to be energized in accordance with the circuit current. By means of such transient shunt, the impedance relays were protected against false operations.

In the operation of any such relay system, the burden on the current transformer becomes an important item, and the most sensitive and efficient arrangement will be that in which the maximum amount of volt-amperes from the current transformer may be utilized to energize the relay winding. The object of the present bridge network, which I disclose herein, is to reduce the burden on the current transformer for the same degree of winding energization. With the present bridge network, response to direct current is reduced to zero theoretically, and response restricted to the alternating current component only. Thus a high response ratio is achieved.

By means of the present arrangement, which I have provided as shown in Fig. 2, the direct current component of an asymmetric fault current is segregated from the total fault current, and only the remaining alternating current component of the fault current is supplied to the current winding of the relay. In that manner, the energization of the current winding of the relay is positively made dependent upon only the alternating current component of the fault current, and the true impedance value of the circuit at the time of the fault is measured by the impedance relay so that the true distance to the location of the fault is measured rather than an apparent distance as the case when the direct current component of a fault current influences a relay winding.

With the system disclosed herein, the operation of an impedance relay is, therefore, guarded against false operations, caused by variable unconstant effects of the direct current components of asymmetric faults, that would cause the relay to indicate that the fault condition exists at an apparent location spaced from the true location.

When the apparent location of the fault is improperly indicated, the protective impedance relay may fail to function to open the circuit interrupter associated with the faulty section or it may cause the interrupter to disconnect a section of the system that is normal and sound, instead of permitting the proper relay, that is associated with the defective section, to operate to disconnect only that defective section.

The provision of a segregating network, as illustrated, provides a safeguard against the influences of the direct current component and its consequent erratic influences upon the operation of the relays associated with the circuit.

In the case of the first current transformer circuit, shown in Fig. 1, for energizing a current winding of the relay, the volt ampere burden of the relay is less than if it were connected directly across the circuit. The response of the relay in both cases to direct current is practically zero, whereas the response to the normal system frequency of 60 cycles is relatively high. In the case of the arrangement shown in Fig. 1, the response is reduced only one-half. The resultant overall response ratio, however, is relatively great. That ratio is the ratio of response to alternating current over the response to direct current. In order to obtain the highest ratio of relay-energy input to relay-plus-network input, that is, the maximum fraction of the total energy available for the energization of the current relay winding, the impedance of the relay branch should be equal to one-quarter the sum of all the bridge impedances.

My invention is not limited in its use to those applications illustrated in the drawing, since it may be variously applied, where the protective relay or other electro-responsive device or electrical equipment is to be energized by the circuit current, or by a function of the circuit current, that is free of the direct current component of transients. By means of the bridge network, each component is segregated and may be utilized for control or for measuring purposes.

I claim as my invention:

1. The combination with a distribution circuit subject to an asymmetrical fault current the transient of which can comprise a direct current component and an alternating current component, a relay comprising an operating winding, a network connected to be traversed by a measure of the fault current, said network having different points of substantially equal direct current potential due to said direct current component but unequal alternating current potentials, and means for connecting said winding across said points.

2. The combination with an electrical system subject to an asymmetrical fault current the transient of which can comprise a direct current component and an alternating current component, an operating coil, a network connected to be traversed by a measure of the fault current, said network being of the bridge type providing balanced points and unbalanced points of potential for said components, and means connecting said coil to points of the bridge that will supply substantially only the alternating current component to said coil.

3. The combination with an electrical system subject to an asymmetrical fault current, the transient of which can comprise a direct current component and an alternating current component, a relay comprising a winding and a bridge network for sub-dividing the fault current, the network providing two available current paths for the direct current component of the fault current and a preferred path for the alternating current component, and means connecting the winding to the network in said preferred path but so that the two direct current paths will by-pass the winding.

4. The combination with an electrical system subject to an asymmetrical fault current, the transient of which can comprise a direct current component and an alternating current component, a relay comprising a winding and a network including a bridge for sub-dividing the fault current, the bridge embodying four elements to provide two paths for the direct current component, two elements in each path being similar to the two elements in the other path but reversely disposed, the two elements of each path having equal resistance values to direct current but different impedance values at normal circuit frequency, and means connecting the winding to the respective points in the two paths, that constitute the juncture points between the two elements of each path.

5. The combination with an electrical system subject to an asymmetrical fault current, the transient of which can comprise a direct current component and an alternating current component, a relay comprising a winding, and a network including a bridge for sub-dividing the fault current, to separate the direct current transient component from the sustained alternating current, the bridge comprising four elements arranged to provide two current paths, one path including a resistor and an impedance in the order named, and the other path including an equivalent impedance and an equivalent resistor in the order named, both paths starting from the same first point and ending at the same second point, the resistance value of each resistor and its impedance to direct current being equal, and means connecting the said winding between the two juncture points between the respective elements of the two paths.

6. A protective relay system comprising an operating winding for operating protective apparatus, a network comprised of four elements connected in a closed square bridge circuit, one pair of the parallel elements being resistors of equal value, and the other pair of parallel elements being impedances with equal similar and equivalent resistance characteristics but with reactance characteristics also, the resistance values of all the elements being the same and equal for direct current, and means connecting said winding across diagonal points of said bridge circuit.

7. A protective system for an electric circuit comprising an interrupter in said circuit, and a relay for controlling said interrupter, an actuating winding for said relay, means for energizing said actuating winding in accordance with the alternating current component traversing said circuit, and external impedance devices connected between the circuit and said relay to constitute a bridge-type network establishing two parallel paths for the direct current component of the circuit current, and means connecting the actuating winding of the relay between two normally equi-potential points of said paths, at least one of said devices also comprising a reactance.

8. A protective relay system comprising an operating winding for operating the protective apparatus, bridge network having four arms in a closed loop circuit of two branches, each branch having two of said arms in series, each arm including resistors whereby the bridge may be balanced for direct currents therethrough and across two points, one in each of said branches, at least one of said arms including a conductive reactance whereby the bridge is unbalanced at said points for alternating currents, and means connecting said winding across said points.

9. In an alternating current system, the combination, with a circuit in the system, and an interrupter for the circuit, of a relay for controlling the interrupter according to conditions in the circuit, and means for preventing false operation of the relay upon the occurrence of asymmetric faults on the system, said means comprising a bridge network for segregating the direct-current component from the alternating current component and means for connecting the relay winding to points of relatively equal potential established in the network by the direct current component, said bridge network being unbalanced for the alternating current component at said points.

10. In an alternating current system, the combination with a circuit of the system, provided with an interrupter to open the circuit, of a relay for controlling the operation of the interrupter according to a faulty condition in the circuit, and a bridge network means energized from the circuit and operative upon the occurrence of an asymmetric fault current in the circuit, said network separating the direct current component from the alternating component of the fault current, means connecting said relay to said network for supplying substantially only the alternating current component to said relay.

11. In an alternating current system, the combination with a circuit of the system, provided with an interrupter to open the circuit, of a relay for controlling the operation of the interrupter according to a faulty condition in the circuit, and a network of inductive impedances and non-inductive resistances energized from the circuit and operative to sub-divide an asymmetric fault current in said circuit into its direct-current component and its alternating current component, and means connecting the relay in a path traversed substantially only by the alternating component.

12. In an alternating current system, the combination with a circuit conductor in the system, an instrument transformer cooperating with said conductor, a bridge network connected to the secondary of said transformer, said network comprising two parallel impedance branches each comprising two arms, the resistances in the arms of each branch being equal, a relay, means connecting said relay across the junction point of the arms of said branches, two diagonal of said arms having inductance values predominating the other arms.

13. In an electrical system subjected to an asymmetric current including a direct-current component and an alternating-curent component, the combination of a network connected to be energized by said system, said network being of the bridge type providing parallel paths with points in each path across which the potential resulting from one of said components is substantially negligible, and a potential exists resulting from the other component, an operating member, means connecting said member across said points whereby to respond substantially only to said existing potential.

14. In a system-affecting circuit for an electrical system subjected to an asymmetric current including a direct-current component and an alternating-current component, said circuit including instrument transformer means having output sides, a system-affecting means, the combination of a network connected to be energized by said output sides, said network being of the bridge type providing points across which the potential resulting from one of said components is substantially negligible, but across which an operating potential exists resulting from the other component, and an operating member for said system-affecting means connected to be responsive substantially only to said existing potential.

15. In a system-affecting circuit for an electrical system subjected to an asymmetric current including a direct-current component and an alternating-current component, said circuit including instrument transformer means having output sides, a system-affecting means, the combination of a bridge network having two parallel paths, each path having an intermediate point, said paths including resistances to substantially balance the voltage drops to said intermediate points due to the said direct-current component, and including reactances to unbalance the voltage drops to said intermediate points due to said alternating-current component, and an operating member for said system-affecting means connected across said points.

ROBERT D. EVANS.